(12) United States Patent
Kim et al.

(10) Patent No.: US 8,056,016 B2
(45) Date of Patent: Nov. 8, 2011

(54) METHOD AND MOBILE COMMUNICATION TERMINAL FOR CHANGING THE MODE OF THE TERMINAL

(75) Inventors: Dong-Kyun Kim, Seoul (KR); Joon-Suh Kim, Anyang-si (KR); Gee-Hong Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 852 days.

(21) Appl. No.: 12/099,391

(22) Filed: Apr. 8, 2008

(65) Prior Publication Data
US 2008/0256472 A1 Oct. 16, 2008

(30) Foreign Application Priority Data
Apr. 9, 2007 (KR) .................. 10-2007-0034703

(51) Int. Cl.
*G06F 3/048* (2006.01)

(52) U.S. Cl. ...................................................... 715/833
(58) Field of Classification Search .................. 715/769, 715/772, 779, 860, 861, 864, 792, 810, 817, 715/833, 834
See application file for complete search history.

(56) References Cited

U.S. PATENT DOCUMENTS
2007/0277123 A1* 11/2007 Shin et al. ...................... 715/863
2007/0277124 A1* 11/2007 Shin et al. ...................... 715/863

FOREIGN PATENT DOCUMENTS
KR 1020060062962 6/2006
* cited by examiner

*Primary Examiner* — Thanh Vu
(74) *Attorney, Agent, or Firm* — H.C. Park & Associates, PLC

(57) ABSTRACT

Disclosed is a mobile communication terminal and a method for changing modes of the terminal, which changes a mode of the mobile communication terminal according to a location of a changed menu bar if a menu bar displayed on a touch screen is dragged and dropped.

20 Claims, 5 Drawing Sheets

METHOD AND MOBILE COMMUNICATION TERMINAL FOR CHANGING THE MODE OF THE TERMINAL

CROSS REFERENCE TO RELATED APPLICATION

This application claims priority from and the benefit of Korean Patent Application No. 10-2007-0034703, filed Apr. 9, 2007, which is hereby incorporated by reference for all purposes as if fully set forth herein.

BACKGROUND OF THE INVENTION

1. Field of the Invention

The present invention relates to a mobile communication terminal, and more particularly to a method and mobile communication terminal for changing the mode of the terminal.

2. Discussion of the Background

Recently, mobile communication terminals have been equipped with various complex functions, such as photography, MP3 play, broadcasting reception, and the like. Accordingly, recent mobile communication terminals have been developed to be complex wireless terminals having emphasized multimedia functions. In this respect, display windows of the mobile communication terminal have been enlarged, and many functions have been added to the mobile communication terminals.

A Physical User Interface (PUI) is a physical medium, such as a button, a switch, or a knob, which may help a user interact with the instrument and equipment. Physical characteristics of everything that a user can touch and manipulate, such as an array of buttons, a shape of a knob, a sense of grip of an external shape, or the like in a certain device or product may be included in a range of the PUI.

The PUI may be limited to a button or a key input in a conventional mobile communication terminal. Therefore, with the increase in functions of the mobile communication terminal, use of the mobile communication terminal may become complicated. Especially, when changing modes, the mobile communication terminal may require many key inputs, which may require much time to input the specific keys. This problem is evident in a mobile communication terminal equipped with a touch screen. Such a mobile communication terminal provides an interface based on touch. However, its capability to change modes of various functions through a simple key input may be limited. Further, changing modes in the conventional mobile communication terminal may be complicated and inefficient. Accordingly, a new PUI that allows a user to control respective functions easily and conveniently is needed.

SUMMARY OF THE INVENTION

The present invention provides a method of changing modes that may enable a user to change modes more easily, and a mobile communication terminal.

The present invention also provides a method of changing modes that provides a user interface that may improve both the aesthetic sense of a mobile communication terminal and user convenience, and a mobile communication terminal.

Additional features of the invention will be set forth in the description which follows, and in part will be apparent from the description, or may be learned by practice of the invention.

The present invention discloses a method of changing modes in a mobile communication terminal equipped with a touch screen, including dividing the touch screen into at least two regions and displaying a menu bar in one of the at least two regions, determining if the menu bar is dragged and dropped while a first mode corresponding to a location of the menu bar is being executed, identifying a region in which the menu bar is placed when the menu bar is dragged and dropped, and changing to a second mode corresponding to the identified region and displaying a user interface corresponding to the second mode.

The present invention also discloses a mobile communication terminal for changing modes, including a touch screen, a memory to store a user interface corresponding to a respective mode and a range of coordinates for a respective region of the touch screen including at least two regions, and a controller. The touch screen displays the user interface stored in the memory, displays a menu bar at a first region of the touch screen according to the range of the coordinates, and receives a drag and drop input for the menu bar. The controller calculates the coordinates of a location of the menu bar if the menu bar displayed on the touch screen is dragged and dropped, identifies a second region in which the calculated coordinates is included, changes the mobile communication terminal to a new mode corresponding to the second region, and causes the touch screen to display a user interface corresponding to the new mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention, and together with the description serve to explain the principles of the invention.

DETAILED DESCRIPTION OF THE ILLUSTRATED EMBODIMENTS

Figure 1:
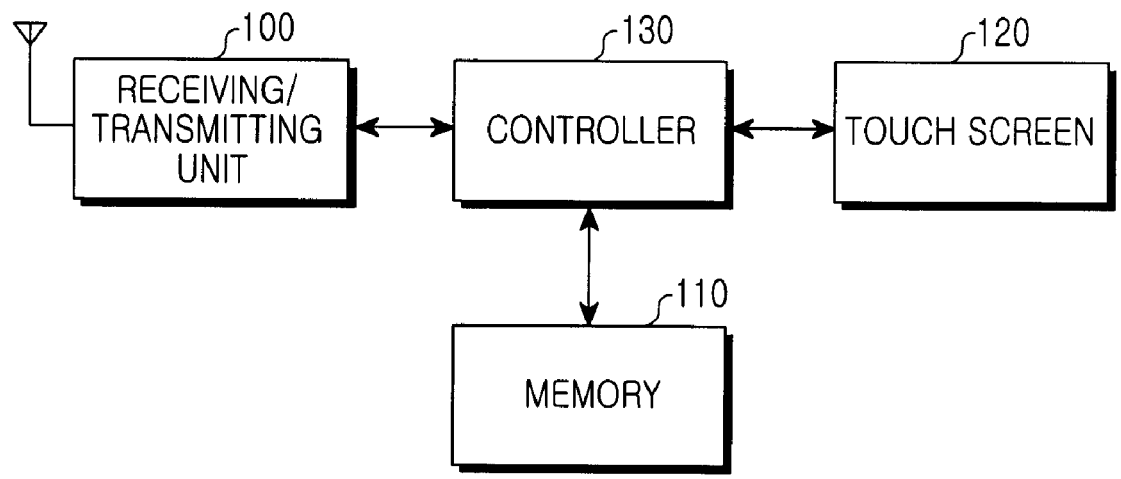
FIG. 1 is a block diagram showing a mobile communication terminal that changes modes according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Exemplary embodiments of the present invention propose a method of changing modes and a mobile communication terminal. If a menu bar displayed on a touch screen is dragged and dropped, exemplary embodiments of the present invention change a mode of the mobile communication terminal to correspond to the new location of the menu bar. The foregoing method is advantageous in that it may change the mode of the mobile communication terminal through a simpler and more dynamic interface.

Hereinafter, a mobile communication terminal that changes modes according to an exemplary embodiment of the present invention will be described with reference to FIG. 1.

Referring to FIG. 1, a mobile communication terminal includes a transmitting/receiving unit 100, a memory 110, a touch screen 120, and a controller 130.

The transmitting/receiving unit 100 performs a wireless communication function of the mobile communication terminal. The memory 110 may include a Read Only Memory (ROM), a Random Access Memory (RAM), or the like to store a plurality of programs and data. In particular, the memory 110 stores a user interface of a mode corresponding to a location of a menu bar displayed on the touch screen 120 and a range of coordinates for a respective region of the touch screen 120 that is divided into at least two regions.

The touch screen 120 recognizes a location and sends an instruction to the controller 130 to perform a specific process using stored software if a hand of a person or an object touches a character or a specific location displayed on the touch screen 120. The touch screen 120 may display data activated by the touch of a user under a control of the controller 130, or may display an operation state of the mobile communication terminal and a plurality of information as an icon and a character. If the touch screen 120 according to the exemplary embodiment of the present invention is divided into at least two regions and a menu bar is placed in one of the at least two regions, a corresponding mode has been set. Therefore, a user interface of the mode corresponding to the location of the menu bar is output on the touch screen 120.

The controller 130 determines if the touch input and the drag and drop input of the menu bar are executed to the touch screen 120. Further, if the touch input is executed, the controller 130 outputs the operating state corresponding to the touch input and the display data to the touch screen 120. Furthermore, if the drag and drop input is executed according to the exemplary embodiment of the present invention, the controller 130 changes to a mode corresponding to the location of the menu bar changed by the drag and drop input. Specifically, if the menu bar displayed on the touch screen 120 is dragged and dropped, the controller 130 calculates the coordinates of the location of the menu bar and identifies a region in which the calculated coordinates are included. In addition, the controller 130 changes to a mode corresponding to the identified region and displays a user interface corresponding to the new mode on the touch screen 120. The detailed description thereof is described with reference to FIG. 2A, FIG. 2B, and FIG. 2C.

Figure 2:
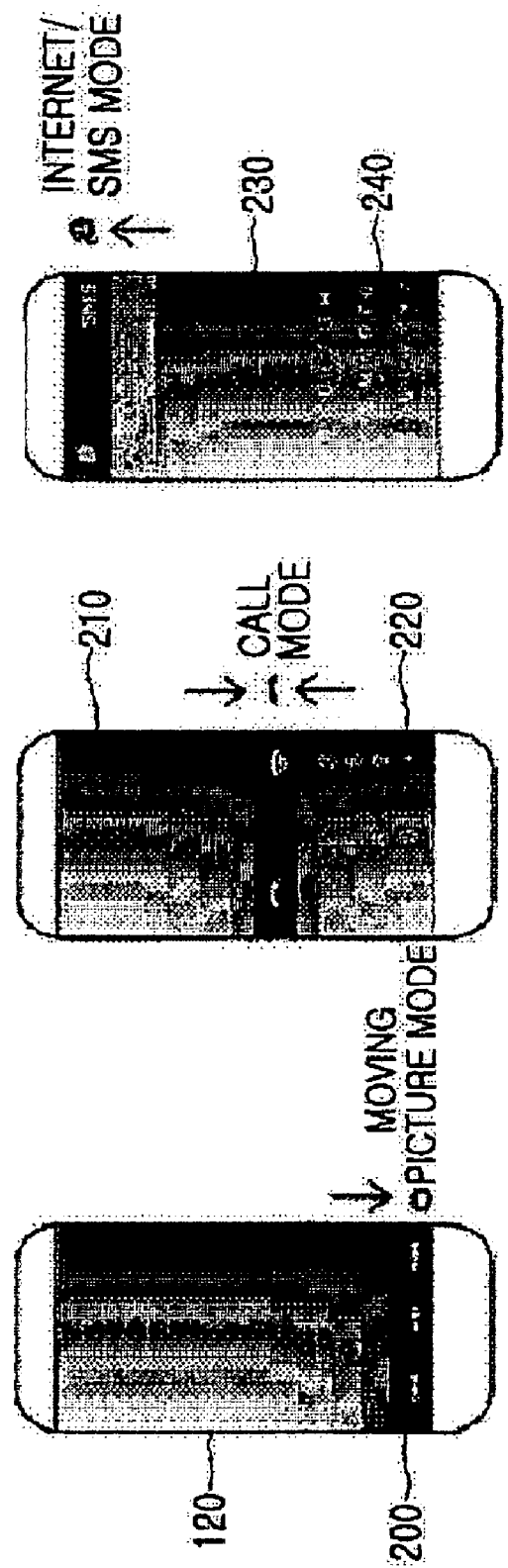
FIG. 2A, FIG. 2B, and FIG. 2C are diagrams showing touch screens of a mobile communication terminal that changes modes according to an exemplary embodiment of the present invention.

Referring to FIG. 2A, FIG. 2B, and FIG. 2C, the touch screen 120 includes a menu bar 200 indicating at least one menu item icon corresponding to a respective mode. The width of the menu bar 200 is identical to the width of the touch screen 120, and a corresponding mode changes based on the displayed location of the menu bar 200. Therefore, the menu bar 200 may be moved up and down according to the drag and drop input from a user on the touch screen 120.

If the touch screen 120 is divided into to an upper region and a lower region, the menu bar 200 may be fixed and displayed on any one region of the uppermost portion and the lowermost portion of the touch screen 120, which correspond to the upper region and the lower region, respectively. If the touch screen 120 is divided into to an upper region, a middle region, and a lower region, the menu bar 200 may be fixed and displayed on any one region of the uppermost portion, the center, and the lowermost portion of the touch screen 120, which correspond to the upper region, the middle region, and the lower region, respectively.

The touch screen 120 according to the exemplary embodiment of the present invention can display any of a moving picture mode, a call mode, and an internet mode based on the location of the menu bar 200. Of course, other modes may be used instead of the moving picture mode, call mode, and internet mode.

FIG. 2A is a diagram showing a touch screen 120 with the menu bar 200 in a location corresponding to a moving picture mode. The menu bar 200 in the moving picture mode is placed at the lowermost portion of the touch screen 120, and it is provided with menu item icons such as play, fast forward, rewind, or the like.

If the menu bar 200 is placed at the center of the touch screen 120 by the drag and drop input of a user, the controller 130 changes to a call mode, as shown in FIG. 2B. Then, the controller 130 outputs a display unit 210 to display input key data in the upper region above the menu bar 200 displayed at the center of the touch screen 120, and outputs a key input unit 220 including 3×4 keys in the lower region under the menu bar 200. At this time, the controller 130 may change the menu item icons into a 'call button' icon and 'call end button' icon corresponding to the call mode.

Further, if the menu bar 200 is displayed at the uppermost portion of the touch screen 120 by the drag and drop input of a user, the controller 130 shifts to the internet mode. Referring to FIG. 2C, the touch screen 120 displays an internet display window 230 and a key input unit 240 under the control of the controller 130. The controller 130 displays menu item icons of an internet menu item and a Short Message Service (SMS) menu item at the menu bar 200, so that any one of two displayed menu item icons may be selected. If the SMS menu item icon is selected, the controller 130 displays the key input unit and a display window for the SMS on the touch screen 120 (not shown in FIG. 2A, FIG. 2B, and FIG. 2C).

As described above, in order to change the mode using the menu bar 200, the particulars relevant to changing the mode should be set in the touch screen 120. Details thereof will be described with reference to FIG. 3.

Figure 3:
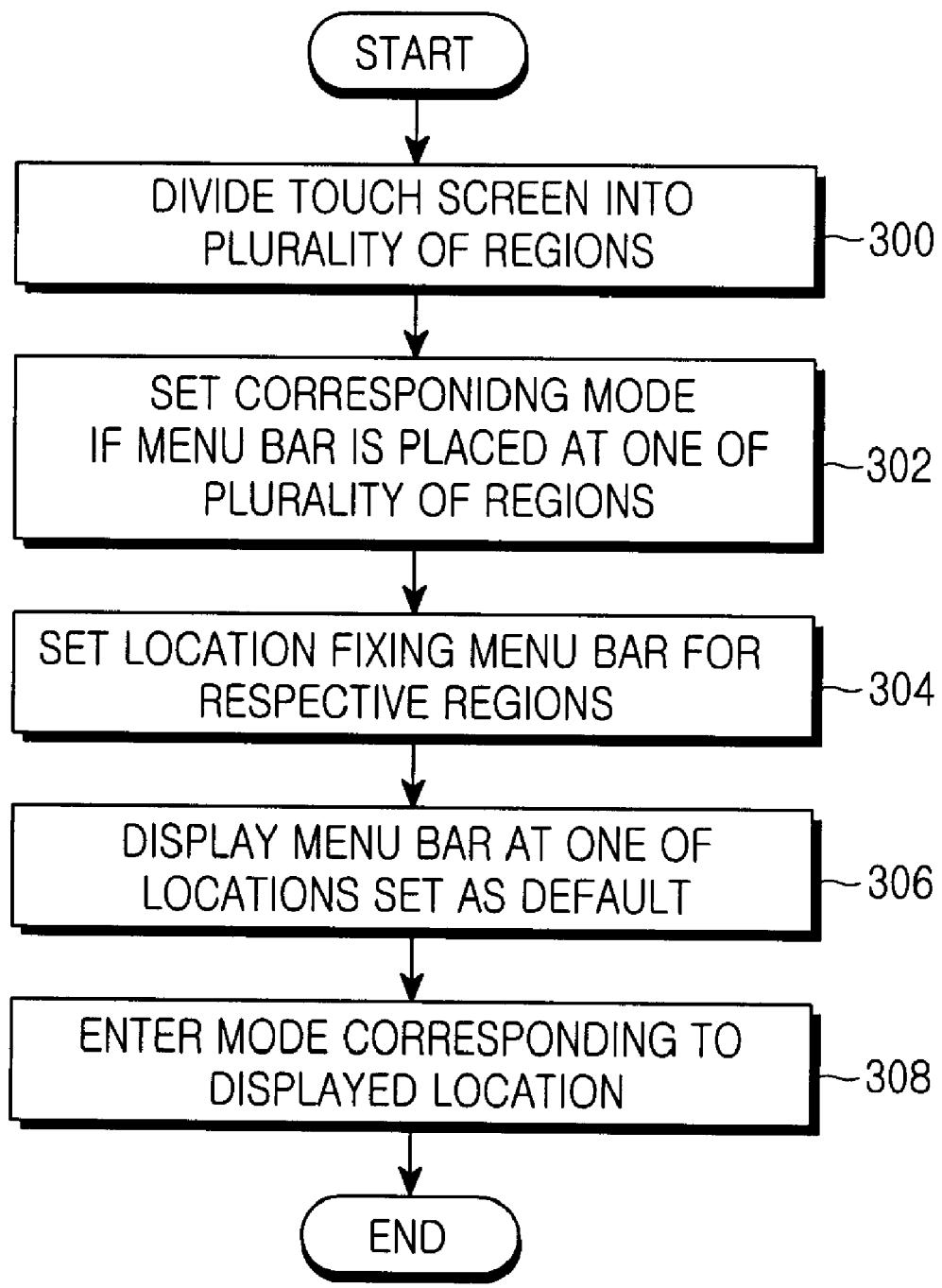
FIG. 3 is a flowchart showing a method of setting a mode corresponding to a location of a menu bar according to an exemplary embodiment of the present invention.

Referring to FIG. 3, a controller 130 divides the touch screen 120 into a plurality of regions (300), and sets a corresponding mode if the menu bar is placed at any one of the plurality of the regions (302). A touch screen 120 can be divided into an upper region and a lower region, or an upper region, a middle region, and a lower region. However, the method of dividing the touch screen may vary. In the exemplary embodiments of the present invention, a case in which the touch screen is divided into an upper region, a middle region, and a lower region is explained. Accordingly, if the menu bar is placed in the upper region of the touch screen, the controller 130 may set an internet mode in the portable communication terminal. If the menu bar is placed in the middle region of the touch screen, the controller 130 may set a call mode in the portable communication terminal. If the menu bar is placed in the lower region of the touch screen, the controller 130 may set a moving picture mode in the portable communication terminal. As such, each mode may correspond to a different region where the menu bar may be placed.

If the menu bar is placed in the upper region of the touch screen 120, the controller 130 may set the location in which the menu bar is fixed to be the uppermost portion according to the exemplary embodiment of the present invention. If the menu bar is placed in the lower region of the touch screen 120, the controller 130 may set the location in which the menu bar is fixed to be the lowermost portion, and if the menu bar is placed in the middle region of the touch screen 120, the controller 130 may set the location in which the menu bar is fixed to be the center of the touch screen 120. When the controller 130 has completed setting the location in which the menu bar is fixed for each region, it displays the menu bar at the fixed location based on the region in which the menu bar is placed. After setting the modes as described, the controller 130 displays the menu bar as a default at one of the preset locations (306). Then, the controller 130 enters a mode corresponding to the location displaying the menu bar (308). According to the exemplary embodiment of the present invention, the controller 130 displays the menu bar as a default at the center of the touch screen 120, and enters the call mode, which corresponds to the displaying of the menu bar at the center of the touch screen 120.

As such, the mobile communication terminal set according to the described method displays the menu bar movable through the drag and drop on the touch screen 120, which may increase user convenience by making it easier to change modes.

Hereinafter, a method of changing a mode in a mobile communication terminal according to a first exemplary embodiment of the present invention is described with reference to FIG. 4.

Figure 4:
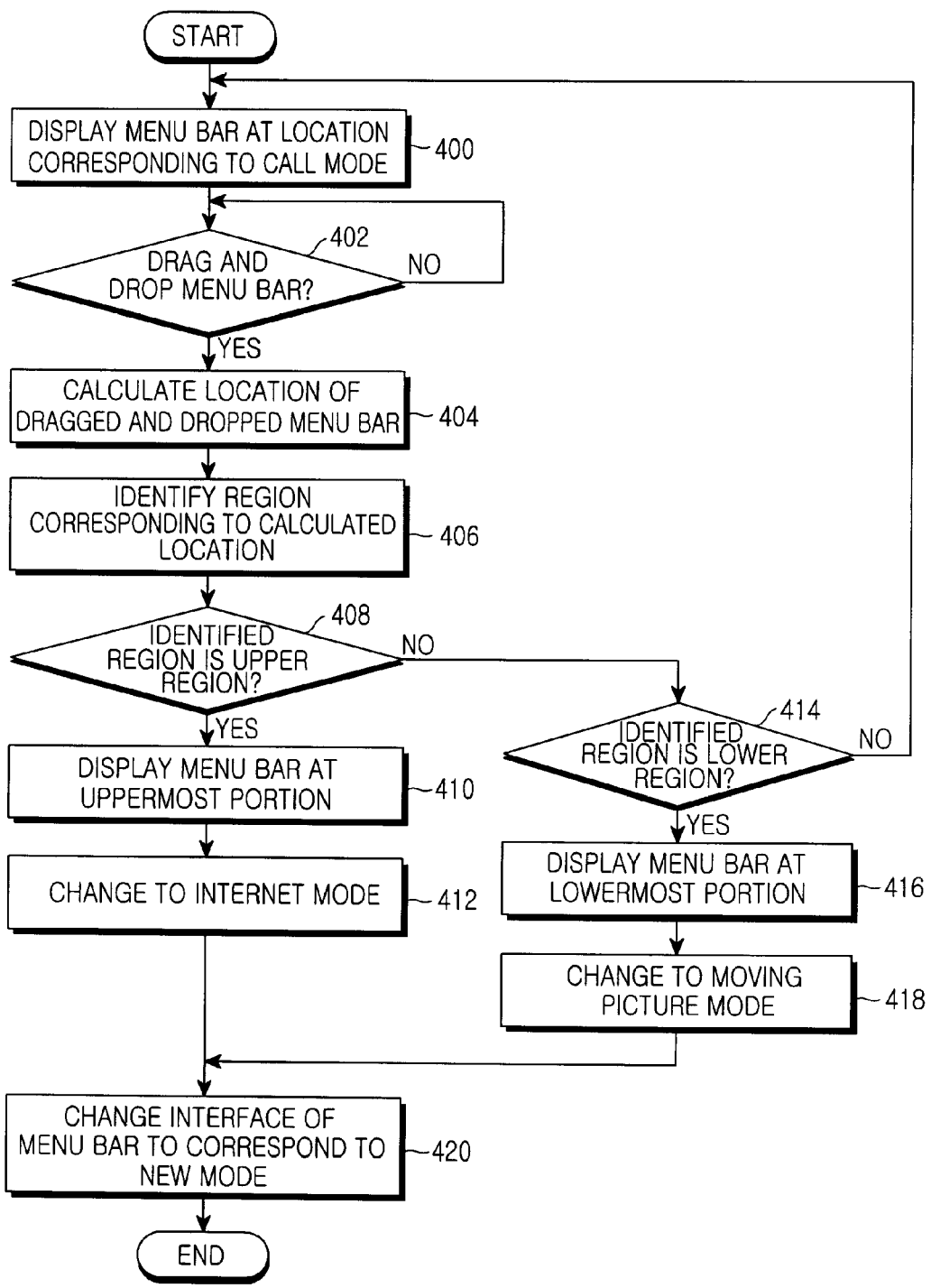
FIG. 4 is a flowchart showing a method of shifting a mode in a mobile communication terminal according to a first exemplary embodiment of the present invention.

Referring to FIG. 4, a controller 130 displays a menu bar at a location corresponding to a call mode (400). According to the exemplary embodiment of the present invention, the menu bar is displayed in the center of the touch screen 120 in the call mode, which is set as a default.

In the call mode, the controller 130 determines if the menu bar has been dragged and dropped (402). If the menu bar has been dragged and dropped, the controller 130 calculates the location in which the menu bar is dragged and dropped (404). Then, the controller 130 identifies a region corresponding to the calculated location (406). That is, the controller 130, according to the exemplary embodiment of the present invention, calculates coordinates for the location of the menu bar changed by the drag and drop input, and identifies where the calculated coordinates are included among an upper region, a middle region, and a lower region of a touch screen 120.

Then, the controller 130 determines if the identified region is included in the upper region (408). If the controller 130 determines that the identified region is included in the upper region, the controller 130 displays the menu bar at an uppermost portion (410). At this time, the menu bar may be displayed as it automatically moves toward the predetermined uppermost portion. Accordingly, even though a user does not raise the menu bar up to the uppermost portion precisely, the menu bar can be displayed at the predetermined location. As such, exemplary embodiments of the present invention display the menu bar at the fixed location so that it can make the most use of a display region of the touch screen 120. Further, the exemplary embodiments of the present invention automatically display the menu bar at the closest fixed location so that it may be possible to change modes more accurately. Accordingly, the location in which the menu bar is fixed is preset as the uppermost, the center, and the lowermost portion according to the exemplary embodiment of the present invention. In such a manner, if the menu bar is displayed at the uppermost portion, the controller 130 changes the mobile communication terminal to an internet mode (412).

If it is determined that the identified region is not included the upper region in step 408, the controller 130 determines if the identified region is included in the lower region (414). Here, if it is determined that the identified region is also not the lower region, the identified region is considered to be the middle region, and the mobile communication terminal returns to step 400. If it is determined that the identified region is included in the lower region, the controller 130 displays the menu bar at the lowermost portion (416). Then, the controller 130 changes to the moving picture mode (418).

As described above, the mode change may be executed by changing a user interface displayed on the touch screen 120. The method of outputting a user interface to the touch screen 120 will be later described in detail. The method of outputting a user interface to the touch screen 120 according to the exemplary embodiment of the present invention may be classified into two methods.

First, the controller 130 outputs a user interface to the touch screen 120 at one time when the menu bar is displayed at a fixed location. In this case, if the menu bar is moved through the drag and drop by a user, the controller 130 does not display a menu item icon of the menu bar and all user interfaces in the touch screen 120. That is, the controller 130 continues to execute a current mode in a background without displaying the current mode on the touch screen 120 until the menu bar is fixed. This is because, if the menu bar is dragged and dropped, a user cannot estimate which mode to select so it is not necessary to output a user interface. Therefore, it is not until the menu bar is displayed at the fixed location of another region that the controller 130 displays a user interface corresponding to the new mode on the touch screen 120.

The user interface may be displayed moving with the menu bar on the touch screen 120. That is, if the menu bar moves through the drag and drop, the controller 130 displays a user interface having a size that makes it capable of being displayed in the upper region or the lower region of the menu bar. The process will be described in detail with an example of changing from a moving picture mode to a call mode. A user drags and drops the menu bar placed at the lowermost portion, which corresponds to the moving picture mode, toward the middle region. The menu bar according to the exemplary embodiment of the present invention can be compared to a scroll bar. Therefore, if the menu bar is dragged and dropped toward the upper direction, the interface which will be output on the touch screen 120 is displayed scroll up together with the menu bar. Further, if the menu bar is dragged and dropped toward the lower direction, the interface which will be output on the touch screen 120 is displayed scroll down together with the menu bar. Therefore, the key input unit including 3×4 keys in the lower region of the menu bar according to the exemplary embodiment of the present invention is displayed scroll up based on the menu bar which is dragged and dropped toward the upper direction. As such, a user interface displayed on the touch screen 120 is dependent on movement of the menu bar. The method of outputting a user interface different from the conventional method enables the mobile communication terminal to have a more intuitive and active user interface.

If the mode is changed according to the foregoing method, the controller 130 changes the menu item icon of the menu bar to correspond to the internet mode (420). Particularly, the controller 130 displays menu item icons such as 'internet' and 'SMS' on the menu bar in the internet mode, and displays menu item icons such as 'play', 'rewind', 'fast forward', or the like on the menu bar in the moving picture mode. Further, the controller 130 displays the menu item icons such as a 'call' button and a 'call end' button on the menu bar in the call mode.

Accordingly, exemplary embodiments of the present invention are advantageous in that the location of the menu bar is changed by employing a scheme of drag and drop so that it is possible to change modes more simply and flexibly. Furthermore, exemplary embodiments of the present invention have a hold function to fix the location of the menu bar, which may make it convenient to maintain the mode regardless of the drag and drop of a user.

Hereinafter, a method of automatically moving a location of a menu bar according to a secondary exemplary embodiment of the present invention is described with reference to FIG. 5.

Figure 5:
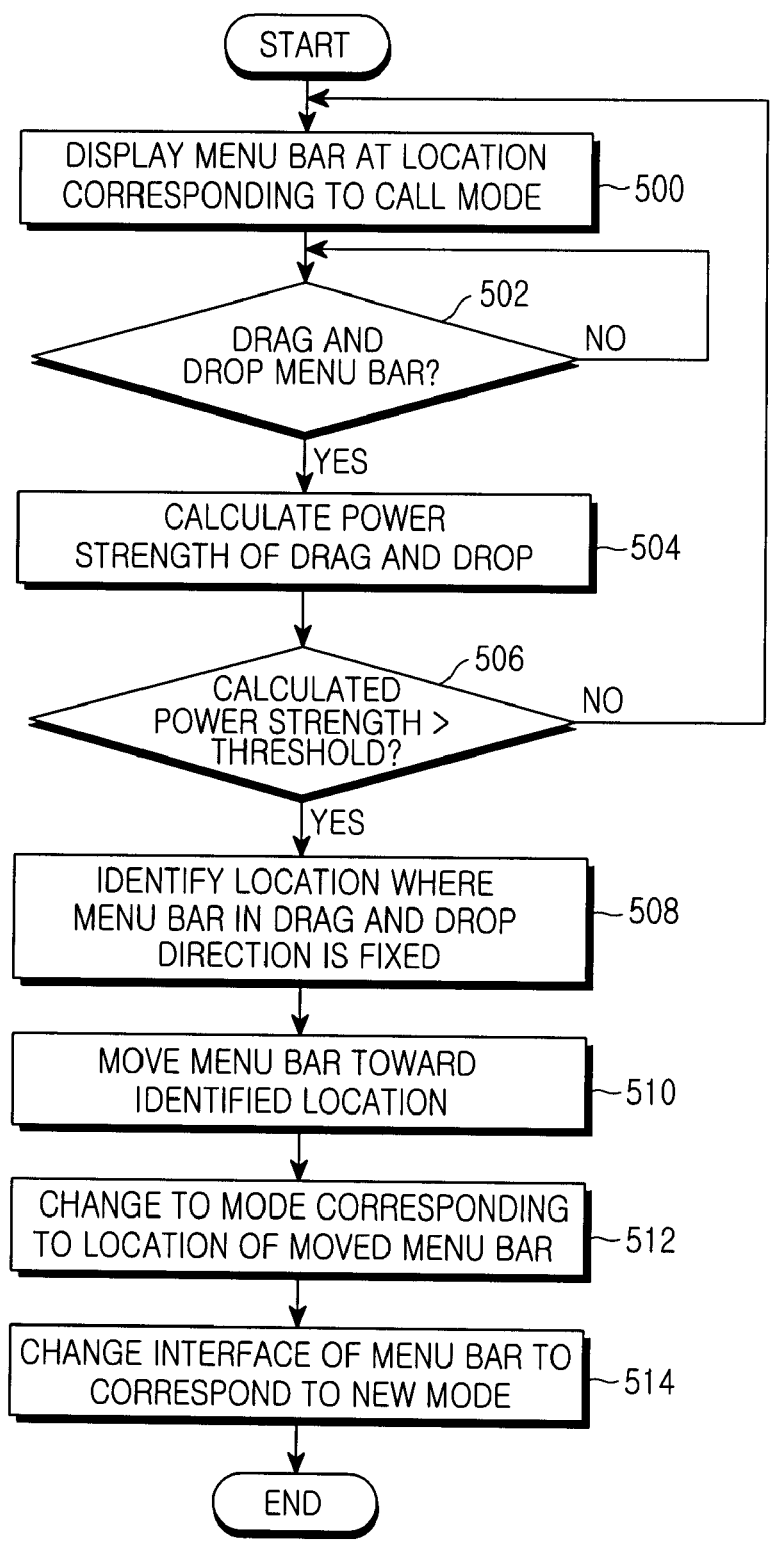
FIG. 5 is a flowchart showing a method of changing modes in a mobile communication terminal according to a secondary exemplary embodiment of the present invention.

Referring to FIG. 5, the controller 130 displays a menu bar at a location corresponding to a call mode (500) and determines if the menu bar has been dragged and dropped (502). The menu bar according to the exemplary embodiment of the present invention is displayed at the center of the screen in a call mode, which may be a default mode. However, the location of the menu bar and the corresponding mode may vary.

The controller 130 determines that the menu bar has been dragged and dropped, the process proceeds to step 504, or otherwise it returns to step 500. The controller 130 calculates strength of the power for the drag and drop (504). In other words, the controller 130 calculates the strength of the power of the touch to the touch screen 120 through the drag and drop.

Then, the controller 130 determines if the strength of the calculated power is greater than a threshold in step 506. In order to automatically move a location of the menu bar, the drag and drop input having the power greater than the threshold is required. The reason for comparing the strength of the power of the drag and drop with the threshold is to prevent the mode from shifting when an unintentional touch from a user occurs. Therefore, if the controller 130 determines that the calculated strength of the power is greater than the threshold according to the result, and the process proceeds to step 508, or otherwise it returns to step 500.

The controller 130 identifies the location where the menu bar on the direction for the drag and drop is fixed (508). The location where the menu bar is fixed may be any one of an upper region, a middle region, and a lower region, and if the fixed location is identified as two regions, the controller 130 selects the fixed location which is the closest to the location of the menu bar that is dragged and dropped. If the drag and drop having greater power than the threshold is input toward the upper region to the menu bar placed at the lowermost portion, the controller 130 identifies two fixed locations of the center and the uppermost portion. At this time, the controller 130 determines the center, which is the closest to the location of the menu bar currently existing at the lowermost portion as the location to which the menu bar will be moved. Then, the controller 130 moves the menu bar to the determined location (510). At this time, the menu bar slides. Further, the movement rate of the menu bar may be controlled based on the power strength of the drag and drop. That is, as the power strength of the drag and drop is greater than the threshold, the sliding rate of the menu bar becomes faster. Such a process makes the menu bar move toward the fixed location at one time. In other words, in the described process, one time drag and drop input automatically moves the menu bar to the desired location so that the mode change may be performed more easily and rapidly.

Accordingly, if the menu bar is moved to the fixed location, the controller 130 changing the mode corresponding to the location of the moved menu bar 512. At this time, the touch screen 120 displays a user interface corresponding to the mode. The method of displaying a user interface on the touch screen 120 may be any one of the two methods described in FIG. 4. Next, the controller 130 changes the menu item icon of the menu bar to correspond to the new mode (514). The controller 130 according to the exemplary embodiment of the present invention changes to the call mode, which corresponds to the location of the menu bar displayed at the center of the touch screen 120. Accordingly, a user interface corresponding to the call mode is displayed on the touch screen 120, and the menu item icon of the menu bar is changed to correspond to the call mode.

Accordingly, exemplary embodiments of the present invention provide a method of automatically moving the menu bar so that a user may change the mode more easily and simply. Further, exemplary embodiments of the present invention provide a more active and easier physical user interface, which may improve the aesthetic view of a mobile communication terminal and make it more convenient to change modes.

There is further advantage that the mode change of the mobile communication terminal may be implemented more easily and conveniently through the dynamic, intuitive, and physical user interface using the drag and drop.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of changing modes in a mobile communication terminal equipped with a touch screen, the method comprising:
   displaying a menu bar at a first region of the touch screen, the menu bar comprising a first user interface to control a first mode executed by the mobile communication terminal;
   determining a location of the menu bar, if the menu bar has been dragged and dropped; and
   changing the menu bar and executing a second mode, such that the menu bar displays a second user interface to control an operation of the executed second mode, if the location of the menu bar is determined to be a second region of the touch screen.

2. The method of claim 1, wherein the second mode comprises any one of a moving picture mode, a call mode, and an internet mode.

3. The method of claim 1, wherein the menu bar is moved up or down on the touch screen by the dragging and dropping.

4. The method of claim 1, wherein the second user interface comprises at least two icons corresponding to the second mode.

5. The method of claim 1, wherein the first region is disposed at an upper portion of the display, and the second region is disposed at a lower portion of the display.

6. The method of claim 5, wherein the menu bar is fixed and displayed at one of an uppermost portion and a lowermost portion of the touch screen that correspond to the upper region and the lower region, respectively.

7. The method of claim 1, further comprising changing the menu bar, such that the menu bar displays a third user interface to control a third mode of the terminal, if the location of the menu bar is determined to be a third region of the display.

8. The method of claim 7, wherein:
   the first region is disposed at the center of the display;

the second region is disposed at the bottom of the display; and the third region is disposed at the top of the display.

9. The method of claim 1, wherein the first region is disposed at the center of the touch screen as a default.

10. The method of claim 1, further comprising fixing the location of the menu bar and maintaining the second mode in response to selection of a hold function.

11. A mobile communication terminal for changing modes, comprising:
   a memory to store user interfaces that control respective modes of the mobile communication terminal and to store a range of coordinates corresponding to each of the modes;
   a touch screen divided into regions, to display a menu bar that selectively comprises one of the user interfaces, and to receive a drag and drop input for the menu bar; and
   a controller to calculate the coordinates of a location of the menu bar, to select the user interface of the menu bar, according to the region in which the coordinates are located, such that the menu bar displays a different one of the user interfaces when located in each of the regions.

12. The terminal of claim 11, wherein the modes comprise at least one of a moving picture mode, a call mode, and an internet mode.

13. The terminal of claim 11, wherein:
   the regions comprise an upper region and a lower region of the touch screen;
   if coordinates of the menu bar are determined to be in the upper region, the controller positions the menu bar at the upper edge of the touch screen; and
   if coordinates of the menu bar are determined to be in the lower region, the controller positions the menu bar at the lower edge of the touch screen.

14. The terminal of claim 11, wherein:
   the regions comprise an upper region, a middle region, and a lower region of the touch screen;
   if coordinates of the menu bar are determined to be in the lower region, the controller positions the menu bar at the lower edge of the touch screen;
   if coordinates of the menu bar are determined to be in the upper region, the controller positions the menu bar at the upper edge of the touch screen; and
   if coordinates of the menu bar are determined to be in the middle region, the controller positions the menu bar at the center of the touch screen.

15. The terminal of claim 11, wherein the controller executes a different one of the modes, when the menu bar is located in each of the regions.

16. The terminal of claim 11, wherein:
   if a touch strength applied to the touch screen through the drag and drop is greater than a threshold value, the controller moves the menu bar toward a direction of the drag and drop and displays the menu bar; and
   if the touch strength applied to the touch screen through the drag and drop is less than the threshold value, the controller does not move the menu bar.

17. The terminal of claim 11, wherein if a hold function is selected and the menu bar is subsequently moved, the controller maintains the user interface displayed at the previous position.

18. The terminal of claim 11, wherein if a hold function is selected and the menu bar is subsequently moved, the controller maintains the user interface displayed at the previous position and continues to execute the mode corresponding to the displayed user interface.

19. A method of changing modes in a mobile communication terminal equipped with a touch screen, the method comprising:
   displaying a menu bar in a first region of the touch screen, the menu bar comprising a user interface to control a first mode of the mobile communication terminal;
   determining the location of the menu bar, if the menu bar is moved out of the first region of the touch screen; and
   changing the menu bar, such that the menu bar displays a second user interface to control to a second mode of the mobile communication terminal, if the location of the menu bar is determined to be in a corresponding second region of the touch screen; and
   changing the menu bar, such that the menu bar displays a third user interface to control a third mode of the mobile communication terminal, if the location of the menu bar is determined to be in a corresponding third region of the touch screen.

20. The method of claim 19, wherein the menu bar is moved from the first region to the second region by being dragged and dropped.

* * * * *